(12) United States Patent
Asaad et al.

(10) Patent No.: US 6,823,415 B1
(45) Date of Patent: Nov. 23, 2004

(54) ALL-IN-ONE MOBILE DOCKING STATION AND SYSTEM USED THEREWITH

(75) Inventors: Sameh W. Asaad, Mahopac, NY (US); Nicholas R. Dono, Hopewell Junction, NY (US); Ernest Nelson Mandese, Durham, NC (US); Bengt-Olaf Schneider, Yorktown Heights, NY (US); Kevin W. Warren, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 09/633,876

(22) Filed: Aug. 7, 2000

(51) Int. Cl.[7] .............................................. G06F 13/00
(52) U.S. Cl. ......................... 710/303; 710/300; 710/304
(58) Field of Search ................................ 710/300–304

(56) References Cited

U.S. PATENT DOCUMENTS

| | | | |
|---|---|---|---|
| 5,590,377 A | * | 12/1996 | Smith .......................... 710/303 |
| 5,764,201 A | * | 6/1998 | Ranganathan .................... 345/3 |
| 6,070,214 A | | 5/2000 | Ahern |
| 6,088,752 A | * | 7/2000 | Ahern ........................... 710/303 |
| 6,142,593 A | * | 11/2000 | Kim et al. ................. 312/223.2 |
| 6,161,157 A | * | 12/2000 | Tripathi et al. .............. 710/109 |
| 6,181,318 B1 | * | 1/2001 | Lim ............................ 345/132 |
| 6,341,320 B1 | * | 1/2002 | Watts, Jr. et al. ............ 710/300 |

* cited by examiner

*Primary Examiner*—Tim Vo
(74) *Attorney, Agent, or Firm*—Gail H. Zarick, Esq.; McGinn & Gibb, PLLC

(57) ABSTRACT

A computer system, includes a mobile computer, a docking station for receiving the mobile computer, a bridge having a first side coupled to the mobile computer and a second side coupled to the docking station, and a flat panel display formed with the docking station for being coupled to the mobile computer via the docking station. The docking station includes a dock housing coupled to a desktop display and including a first bus, and a bridge coupled between the first bus and a second bus, the first bus residing in the dock housing and the second bus for being coupled to the mobile computer.

24 Claims, 2 Drawing Sheets

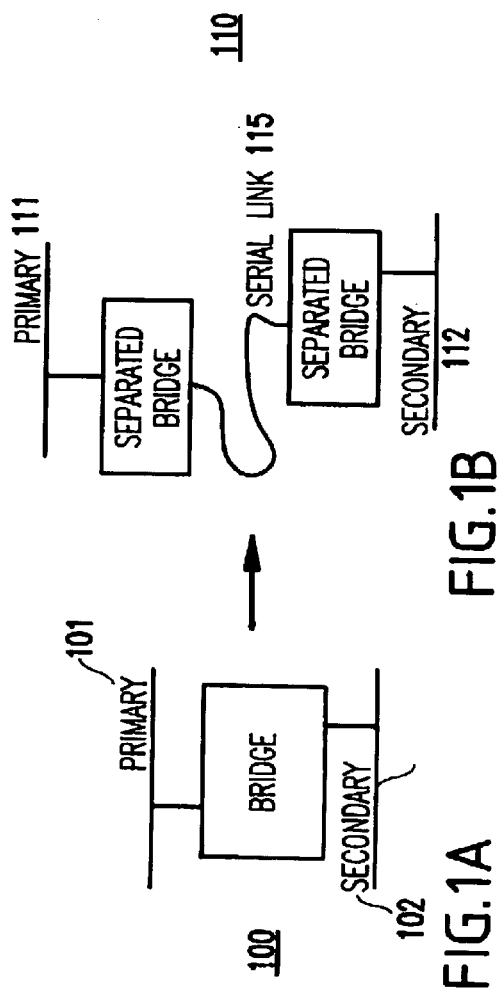
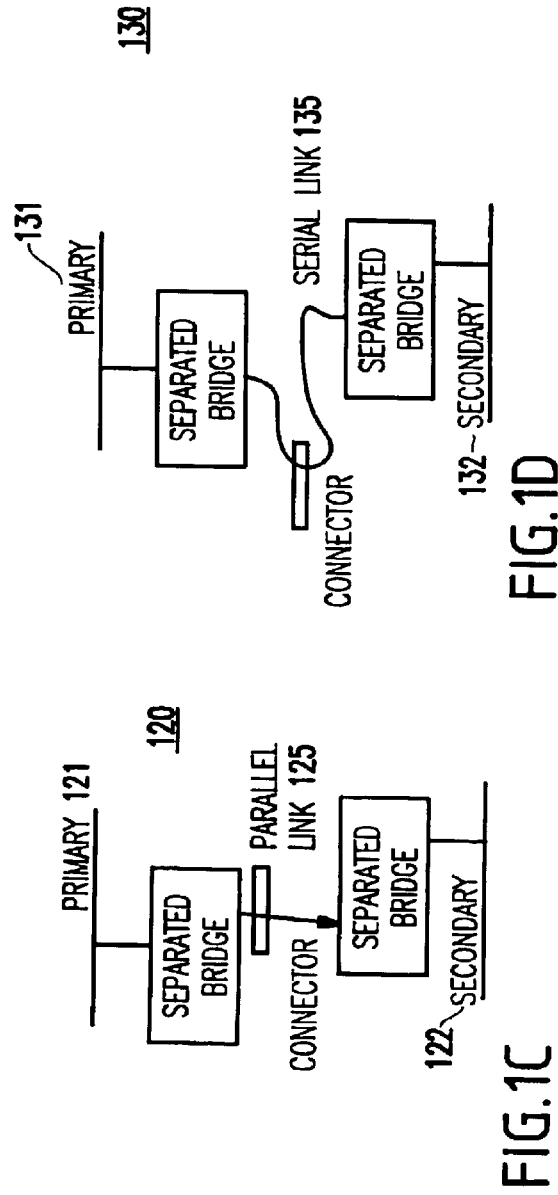

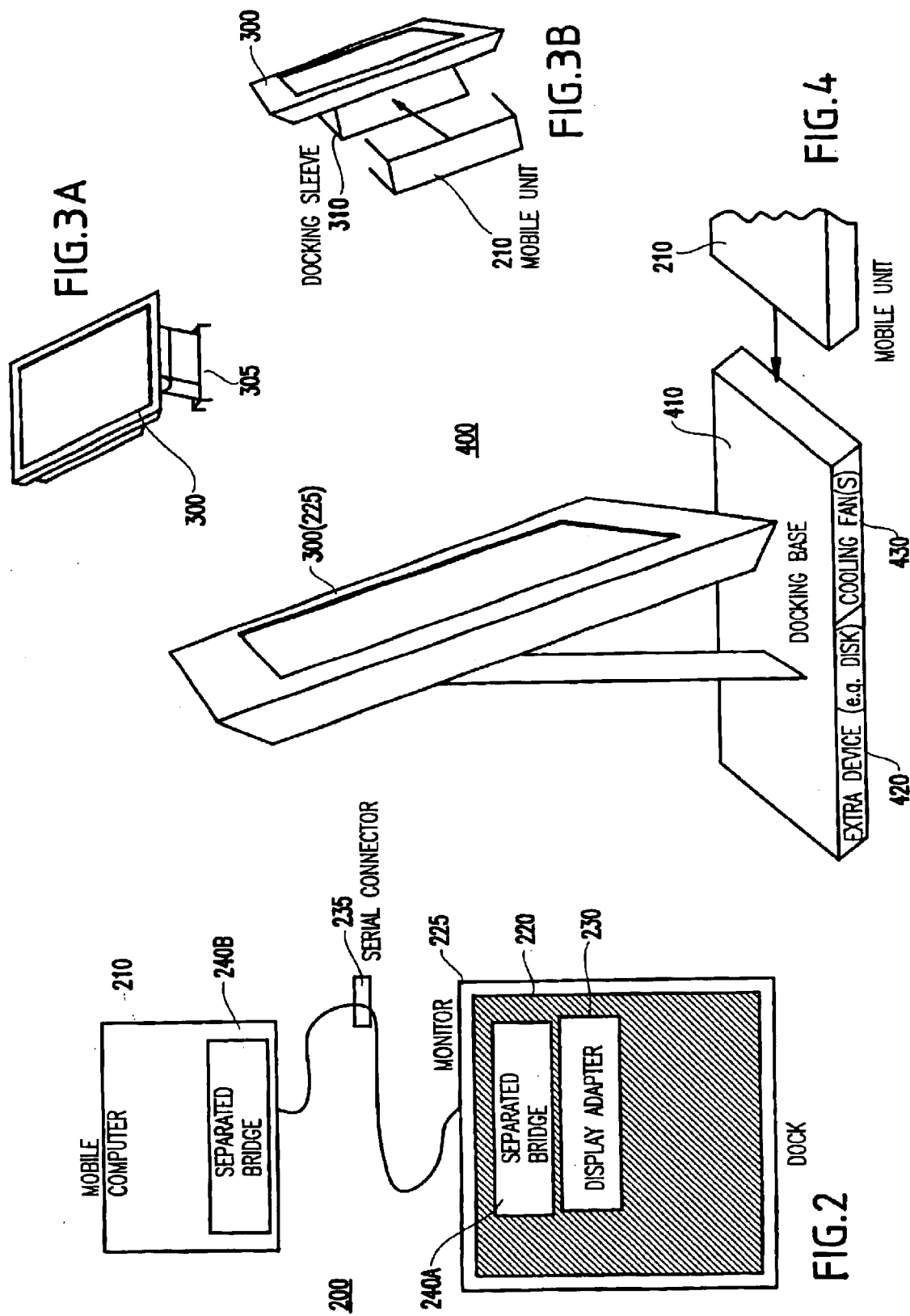

ALL-IN-ONE MOBILE DOCKING STATION AND SYSTEM USED THEREWITH

CROSS-REFERENCE TO RELATED APPLICATIONS

The present application relates to U.S. patent application Ser. No. 09/633,806, filed on Aug. 7, 2000, to Sameh Asaad et al., entitled "METHOD AND SYSTEM FOR HIGH RESOLUTION DISPLAY CONNECT THROUGH EXTENDED BRIDGE", and to U.S. patent application Ser. No. 09/633,825, filed on Aug. 7, 2000, to Samneh Asaad et al., entitled "METHOD AND SYSTEM FOR TRANSPORTING SIDEBAND SIGNALS THROUGH PHYSICAL LAYER OF EXTENDED BRIDGE", and to U.S. patent application Ser. No. 09/633,856, filed on Aug. 7, 2000, to Sameh Asaad et al., entitled "COMMUNICATIONS SYSTEM INCLUDING SYMMETRIC BUS BRIDGE AND METHOD USED THEREWITH", and to U.S. patent application Ser. No. 09/633,826 filed on Aug. 7, 2000, to Sameh Asaad et al., entitled "SYSTEM AND INTELLIGENT DOCK USING A SYMMETRIC EXTENDED BUS BRIDGE AND METHOD THEREFOR", each of which is incorporated herein by reference.

BACKGROUND OF THE INVENTION

1. Field of the Invention

The present invention generally relates to a mobile docking station, and more particularly to a mobile docking station which increases the ease of use and efficiency of a mobile computer coupled thereto.

2. Description of the Related Art

In the modem office and home environment, desk space is at a premium. Increasing numbers of computer users require their computing power and data while in the office, at home and while traveling. Mobile computers provide the means to have the computing power and data move with the user. However, simultaneously computer users have come to expect the high resolution displays offered by today's desktop monitors and the ease of use of a full-size keyboard and pointing device (e.g., a mouse), typically found in the desktop environment.

Hitherto the present invention, such mobile computer offerings have been deficient in efficiency, ease of use, performance, overhead, etc.

For example, some systems require maintaining a separate computer for each use. As a result, it is expensive and time-consuming to keep multiple copies of important applications and data up to date and synchronized. Many users solve the problem by using a single mobile unit for all modes of usage connecting to docking stations and port replicators for access to full-sized monitors and keyboards while at home and the office. However, existing docking solutions are cumbersome, and still require too much desk space (e.g., a large footprint).

Additionally, known prior hardware and software which may perhaps perform a similar function (e.g., an all-in-one-computer design) incorporate the electronics and covers of a conventional desktop computer onto the back of a flat panel LCD display. However, these models are integrated into a common design package and cannot be separated from the display for mobile use.

SUMMARY OF THE INVENTION

In view of the foregoing and other problems of the conventional methods and structures, an object of the present invention is to provide a combined mobile and desktop computing system which is easy to use and which is efficient.

Another object is to provide a mobile docking station with a high-resolution display, a full-size keyboard and pointing device (e.g., a mouse).

Yet another object is to provide a mobile docking station in which a mobile computer can be detached from the structure of a flat panel LCD display.

In a first aspect of the present invention, a docking station for a mobile computer, includes a dock housing coupled to a desktop display and including a first bus, and a bridge coupled between the first bus and a second bus, the first bus residing in the dock housing, and the second bus for being coupled to the mobile computer.

In a second aspect, a communication system, includes a mobile computer including a central processing unit (CPU), an input/output (I/O) bus and a graphics adaptor, a desktop display panel for being operatively coupled to the mobile computer, a pointing device for providing inputs for display on the display panel, a dock for mating with the mobile computer over the input/output (I/O) bus to drive the graphics adaptor and the panel along with the pointing device, the computing power being provided by the mobile CPU with access to the user's data from the mobile computer.

In a third aspect, a computer system, includes a mobile computer having an adaptor, a docking station for receiving the mobile computer, a bridge having a first side coupled to the mobile computer and a second side linked to the docking station, and a flat panel display formed with the docking station for being coupled to the mobile computer via the docking station, the adaptor of the mobile computer using a serial or parallel connector to mate the two sides of the bridge.

With the unique and unobvious aspects of the present invention, a desktop station can dock mobile computers (e.g., laptops, palmtops, devices having the size and functionality of the IBM ThinkPad®, etc.) to a flat panel display with a keyboard and a mouse. The combined mobile unit and dock provide a desktop "all-in-one" design that minimizes the desktop footprint and at the same time combines the power of today's mobile units with the high resolution characteristics of a large screen liquid crystal display (LCD) utilizing full input/output (I/O) bus bandwidth.

Hence, the all-in-one design of the present invention combines the typical desktop computer and the flat panel LCD display to provide a small footprint computer. Further, by replacing the integrated desktop computer components with a docking bay (e.g., a sleeve) and an I/O bus docking connector, a docking station is preferably and exemplarily created with a flat panel LCD display, a digital video interface (DVI) graphics adaptor, a keyboard and a mouse.

Thus, the present invention provides a high performance, low-overhead solution to users desiring mobile computing power while at home, office, or during travel. That is, with the invention, there is no need to maintain a separate computer for each use, thereby avoiding the expense and time consumed in maintaining multiple copies of important applications and data up to date and synchronized. Further, the invention is sleek, has a minimal form factor, and requires a minimum of desk space. Additionally, the all-in-one design of the invention is integrated into a common design package and can be easily and quickly separated from the display for mobile use.

BRIEF DESCRIPTION OF THE DRAWINGS

The foregoing and other purposes, aspects and advantages will be better understood from to the following detailed description of a preferred embodiment of the invention with reference to the drawings, in which:

FIG. 1(a) illustrates a peripheral component interconnect (PCI)-to-PCI bus bridge 100;

FIG. 1(b) illustrates an extended serial bridge 110;

FIG. 1(c) illustrates an extended parallel bridge 120 separating the two sides of the bridge using parallel connectors;

FIG. 1(d) illustrates an extended bridge 130 separating the two sides of the bridge using a serial communications layer;

FIG. 2 illustrates a mobile computer 210 connected to a monitor (e.g., LCD) dock 225 via a serial connector 225;

FIG. 3(a) illustrates a flat panel LCD and its small footprint base, and FIG. 3(b) illustrates schematically the LCD and base; and FIG. 4 illustrates an alternative design with a dock in a base of a display along with an additional device to store additional applications and data for the desktop modality.

DETAILED DESCRIPTION OF PREFERRED EMBODIMENTS OF THE INVENTION

Referring now to the drawings, and more particularly to FIGS. 1(a)–4, there are shown preferred embodiments of the method and structures according to the present invention.
Preferred Embodiment Turning to FIG. 1(a), a peripheral component interconnect (PCI)-to-PCI bus bridge 100 is shown which is a PCI standard architectural component and illustrates a conventional bus bridge between a primary bus 101 and a secondary bus 102.

FIG. 1(b) illustrates an extended serial bridge 110 which separates the two sides of a bridge 110 using either parallel connectors or with a serial communications layer 115.

FIG. 1(c) illustrates an extended parallel bridge 120 using parallel connectors 125, whereas FIG. 1(d) illustrates an extended serial bridge 130 using the serial communications layer 135.

The serial communications layer 135 uses a high bandwidth, low latency serial link, commensurate with the PCI standard's requirements. One side of the separated bridge is placed on a primary bus (e.g., 111, 121, 131), while the other is implemented on a secondary bus (e.g., 112, 122, 132) or bus extension.

A converter (e.g., parallel/serial converter) takes the parallel bus data into a serial stream and back for the communication layer. Such a parallel/serial converter is believed to be well-known and is the subject of other patents and for brevity will not be discussed further hereinbelow. This serial stream can be supported on four wires or pins, as opposed to the typical 49 or more wires of the bus in the conventional arrangement. The system of the invention is not aware of the separation, and thus the separation is transparent to the system and user. Most standard adaptors can be driven off the secondary bus. The Extended bridge concept is not limited to the PCI architecture but can be used to support other bus standards as well (e.g., Microchannel or Accelerated Graphics Port (AGP).

A standard mobile computer can be mated to a dock using either of the above-described serial connection (FIG. 1(d)) or parallel connection (FIG. 1(c)) providing a high bandwidth path (e.g., 133 Mbytes/second) over a standard I/O bus to drive the graphics adaptor and LCD panel along with an input/pointing device (e.g., a mouse) and keyboard. Computing power is provided by the mobile computer's central processing unit (CPU) with access to the user's data from the mobile unit's disk drives. I/O attachments (e.g., a digital video disk (DVD) and the like) can be provided on the mobile unit or over the dock's attached I/O bus.

Turning to FIG. 2, an exemplary system 200 according to the present invention is shown which is an implementation of the configuration of FIG. 1(d). In the extended bridge of FIG. 2, a mobile computer 210 is attachable/connectible to a dock 220. The dock is formed for example, on a Flat Panel LCD display 225 (e.g., a rear, non-viewing side or a base thereof) and its high resolution adaptor 230 using a serial connector 235 (as shown) (or a parallel connector not shown in FIG. 2, but shown in FIG. 1(c)) to mate the two halves 240A, 240B of the extended bridge. In the case of FIG. 2, the computer 210 may be attachable to a side (e.g., a rear side) of the flat panel display 225 to provide a sleek form factor.

In FIG. 2, a first side 240A 6f the separated bridge is placed in the dock 220, while the other is implemented in the mobile computer unit 210. In the exemplary configuration, the mobile unit's bus is the primary bus and the extended bus in the dock 220 acts as the secondary bus. The dock's secondary bus can drive standard adaptors to supply high resolution graphics, SCSI disk drives and other devices commonly found in desktop systems.

Turning to FIG. 3a, a flat panel LCD 300 (similar to LCD 225 of FIG. 2) and its small footprint base 305 are shown. The LCD 300 and base are also shown schematically in FIG. 3b. The mobile unit (e.g., 210 from FIG. 2) is slidably fitted into a docking sleeve 310 of the LCD panel 300, and mates with the serial connector as shown for the dock's secondary bus. The communications link can be supported with much fewer wires (and therefore fewer pins) in the connectors than conventional docking station bus parallel connectors. In principle, conventional docks could also take advantage of a serial bridge. However, the all-in-one mobile dock of the invention is more advantageous because of the low-insertion force required.

As a result, mating the mobile unit 210 to the dock 220/docking sleeve 310 is much easier since less force is required using a small connector. In addition, routing the serial link wiring around the back of the LCD electronics as in the invention is simpler than routing the many wires needed to support a bus (e.g., typically 49 wires or more) directly.

Further, the electromagnetic coupling (EMC) emissions from the serial link are also considerably less than the conventional bus and will avoid unwanted interference with the LCD panel electronics. The high resolution video adaptor is connected to the I/O bus and housed in the base. Preferably, provisions (e.g., PS/2 mouse and keyboard jacks/ports or a USB connector) in the base of the flat panel LCD display allow for easy connection of a keyboard and mouse. Since the full I/O bus is available in the base, other convenience devices such as compact disk drives (CD) or a DVD drive can be included.

For the all-in-one dock to accommodate a variety of mobile computer widths, the dock sleeve preferably is field-mountable (e.g., mountable by the end-user such that different sleeves can be optionally adapted to different laptops) on the back of the all-in-one display and base. For example, the docking sleeve's width, height, and/or length/depth can be adjusted (or preferably the docking sleeve can be replaced) to accommodate different-sized devices. Then, the sleeve or docking mechanicals can be varied for each unit and installed by the user in the field.

Preferably, the docking sleeve has a clip-on or easy "bolt on" component with some variation for the position of the bridge connector and open slots to gain access to whatever ports might not be replicated in the display and base. Hence, preferably, each mobile unit model would have its own dedicated docking sleeve that attaches to the common all-in-one display and base unit of the invention.

As shown in FIG. 4, instead of attaching the mobile unit to a side (e.g., rear side) of the display 300 (225), an alternative design 400 uses the base 410 for the mobile attachment point. Conceptually, the "sleeve" described above is moved to the base 410.

Thus, FIG. 4 illustrates the alternative design with the dock in the base along with an additional device 420 (e.g., a disk drive, etc.) to store additional applications and data for the desktop modality. This design is advantageous in housing the dock and more docking components in the base, and avoiding any changes to the standard flat panel LCD design. To accommodate a variety of docking mechanicals made necessary by today's lack of port placement standards, the base may be constructed in a modular fashion to house different mobile units and a varying number of additional devices to meet individual desktop requirements.

Additionally, many mobile units run their CPUs at reduced CPU power (e.g., millions of instructions per second (MIPs)) to extend time needed between battery charges and to lower the heat generated within the unit. Indeed, such heat is typically passively dissipated through, for example, the keyboard or other areas of the mobile computer. Typically, the CPU power is increased when the mobile unit is connected to AC power lines, but is still limited by concerns for thermal overheating.

To alleviate the thermal heating issue, as shown in FIG. 4, the design of the all-in-one dock preferably accommodates forced cooling using fan(s) 430 in the dock to blow air into and around the docked mobile unit, thereby further increasing the available CPU (MIPs) power on the desktop.

With the unique and unobvious structure of the present invention, a desktop station is provided for docking mobile computers (e.g., laptops, etc.) to a flat panel with keyboard and mouse. The combined mobile unit and dock provide a desktop "all-in-one" design that minimizes the desktop footprint and at the same time combines the power of today's mobile units with the high resolution characteristics of a large screen liquid crystal display (LCD) utilizing full input/output (I/O) bus bandwidth. Thus, the inventive all-in-one design combines the typical desktop computer and the flat panel LCD display to provide a small footprint computer on a desktop work-space. Indeed, the invention is sleek and requires a minimum of desk space.

By replacing the integrated desktop computer components with a docking bay (sleeve) and I/O bus docking connector, a docking station is created preferably with flat panel LCD display, a DVI graphics adaptor, keyboard and mouse.

Thus, the present invention provides a high performance, low-overhead solution to users desiring mobile computing power. With the invention, there is no need to maintain a separate computer for each use, thereby avoiding the expense and time consumed in maintaining multiple copies of important applications and data up to date and synchronized. Additionally, the all-in-one design of the invention is integrated into a common design package and can be separated from the display for mobile use.

While the invention has been described in terms of several preferred embodiments, those skilled in the art will recognize that the invention can be practiced with modification within the spirit and scope of the appended claims.

What is claimed is:

1. A docking station for a mobile computer, comprising:
    a dock housing coupled to a desktop display and including a primary bus; and
    an extended bridge comprising:
        a first side including an end connected to the primary bus of the dock housing;
        a second side including an end connected to a secondary bus for connecting to the mobile computer; and
        a device that implements a serial conversion of one of a peripheral component interconnect (PCI)-to PCI and a Micro Channel communication between the primary bus and the secondary bus; and
    a docking sleeve attached to the dock housing,
    wherein the mobile computer is slidably fitted into the docking sleeve to effect a communication between the primary bus and the secondary bus.

2. The station according to claim 1, wherein said extended bridge comprises a serial bridge, in which another end of said first side and another end of said second side are each connected to a parallel connector.

3. The station according to claim 1, wherein said extended bridge comprises a serial bridge that implements a serial communications layer.

4. The station according to claim 1, wherein the second side of said extended bridge is connected to one of said secondary bus and a bus extension.

5. The docking station according to claim 1, further comprising:
    a video adapter for said display, said video adapter being connected to an input/output (I/O) bus and housed in a base of said display.

6. The docking station according to claim 1, wherein said docking station further includes a base, wherein a portion of said docking station is mounted onto said base, and said base includes a peripheral device for storing an additional application and data for when said mobile computer is used in a desktop mode.

7. The docking station of claim 1, further comprising:
    a graphics adapter connected to said docking station, wherein said gaphics adapter receives display data from said mobile computer through said first bus and said second bus.

8. The station according to claim 3, wherein said extended bridge further comprises a converter for converting parallel bus data into a serial stream and back for the serial communications layer.

9. The station according to claim 3, wherein the serial stream is supported on no more than four wires.

10. The station according to claim 8, wherein the serial stream is supported on four wires.

11. A communication system, comprising:
    a mobile computer including an input/output (I/O) bus and a graphics adapter;
    a desktop display panel coupled to said mobile computer;
    a pointing device for providing inputs for display on said desktop display panel;
    a docking sleeve that connects with the mobile computer and connects the I/O bus to drive the graphics adapter and the desktop display panel, and that connects with the pointing device; and
    an extended bridge comprising:
        a first side including an end connected to a docking sleeve bus and a second side including an end connected to the I/O bus of the mobile computer; and a device that implements a serial conversion of one of a peripheral component interconnect (PCI)-to PCI and a Micro Channel communication between the docking sleeve bus and the I/O bus, wherein the mobile computer is slidably fitted into the docking sleeve to effect a communication between the docking sleeve bus and the I/O bus, and computing power is provided by the mobile computer with access to data from the mobile computer.

12. The system according to claim 11, wherein said extended bridge implements one of a serial communications layer and a parallel communications layer.

13. The communication system of claim 11, wherein said I/O bus, comprises:

a first bus coupled to said dock housing;

a second bus coupled to said mobile computer; and an extended bridge that is coupled between said first bus and said second bus, wherein said extended bridge separates said first bus and said second bus.

14. The communication system of claim 13, wherein one of said first and said second bus comprises a primary bus and the other of said first and said second bus comprises a secondary bus, and wherein said extended bridge comprises a separated bridge such that a first side of the separated bridge is connected to said primary bus, and a second side of said separated bridge is connected to one of said secondary bus and a bus extension.

15. A computer system, comprising:

a mobile computer;

a docking station including a docking sleeve into which said mobile computer slidably fits;

an extended bridge comprising:
  a first side including an end connected to a primary bus of the docking station;
  a second side including an end connected to a secondary bus for connecting to the mobile computer; and
  a device that implements a serial conversion of one of a peripheral component interconnect (PCI)-to PCI and a Micro Channel communication between the primary bus and the secondary bus; and a flat panel display disposed in said docking station, which is coupled to said mobile computer via said docking sleeve, wherein said mobile computer includes one of a serial connector and a parallel connector to connect to another end of the first side and another end of the second side of the extended bridge.

16. The system according to claim 15, wherein said first side of the extended bridge is placed in the docking station and the second end is connected to said mobile computer.

17. The system according to claim 15, wherein said docking station comprises a base of said flat panel display.

18. The system according to claim 15, wherein dimensions of said docking station are selectively adjustable to accommodate a variety of different sized mobile computers.

19. The system according to claim 15, further comprising:

a cooling fan disposed in said docking station.

20. The system according to claim 16, wherein said secondary bus includes adaptors for peripheral components including at least one of a high resolution graphics component and a disk drive.

21. The system according to claim 17, further comprising:

a cooling fan disposed in said base.

22. The system according to claim 20, wherein a base of the flat panel display is selectively connected to one of an input device and a pointing device, and a video adaptor of the display is connected to an input/output (I/O) bus and housed in the base.

23. The system according to claim 22, wherein said input/output (I/O) bus is disposed in said base, said base further comprising at least one of a compact disk (CD) drive and a digital video disk (DVD) drive coupled to said I/O bus in said base.

24. The system according to claim 22, wherein said base comprises a modular component of said display.

* * * * *